United States Patent
Singh et al.

(10) Patent No.: US 12,316,981 B2
(45) Date of Patent: May 27, 2025

(54) REAL TIME STREAM CAMERA ISP WITH LOOSELY COUPLED CONTROL LOOP

(71) Applicant: NXP B.V., Eindhoven (NL)

(72) Inventors: Chanpreet Singh, Noida (IN); Stephan Matthias Herrmann, Markt Schwaben (DE); Sharath Subramanya Naidu, Munich (DE); Nikhil Sharma, Shimla (IN); Bhagwan Babu Jha, Delhi (IN); Maninder Kumar, Madison, WI (US)

(73) Assignee: NXP B.V., Eindhoven (NL)

( * ) Notice: Subject to any disclaimer, the term of this patent is extended or adjusted under 35 U.S.C. 154(b) by 133 days.

(21) Appl. No.: 18/363,012

(22) Filed: Aug. 1, 2023

(65) Prior Publication Data
US 2024/0406579 A1 Dec. 5, 2024

(30) Foreign Application Priority Data
Jun. 5, 2023 (IN) .............................. 202341038599

(51) Int. Cl.
*H04N 23/80* (2023.01)
*H04N 23/73* (2023.01)

(52) U.S. Cl.
CPC ............. *H04N 23/80* (2023.01); *H04N 23/73* (2023.01)

(58) Field of Classification Search
CPC ...... H04N 23/80; H04N 23/73; H04N 23/741; H04N 23/665
See application file for complete search history.

(56) References Cited

U.S. PATENT DOCUMENTS

| | | | |
|---|---|---|---|
| 7,724,284 B2 * | 5/2010 | Mentzer | H04N 25/76 348/262 |
| 9,113,097 B2 | 8/2015 | Yanai | |
| 10,097,766 B2 * | 10/2018 | Pettersson | H04N 23/64 |
| 10,282,805 B2 | 5/2019 | Baek et al. | |
| 10,909,668 B1 | 2/2021 | Naidu et al. | |
| 10,922,781 B1 * | 2/2021 | Singh | G06T 1/60 |
| 10,999,497 B1 * | 5/2021 | Singh | H04N 23/80 |
| 11,483,547 B2 | 10/2022 | Naidu et al. | |
| 2011/0242368 A1 | 10/2011 | Haneda et al. | |
| 2017/0318208 A1 | 11/2017 | Toyoda | |

(Continued)

FOREIGN PATENT DOCUMENTS

CN 116055890 A 5/2023

OTHER PUBLICATIONS

NXP, i.MX 8M Plus Applications Processor Family, Document No. IMX8MPLUSFS Rev 5, 2021.

*Primary Examiner* — Hung H Lam

(57) ABSTRACT

A system, method, and apparatus are provided for on-the-fly camera image processing configuring a system-on-chip (SoC) configuration register memory with one or more synchronization settings; processing multiple camera image frame sequences having different specified exposures to detect a set of complete frames from the camera image frame sequences which have a first common frame number; identifying a valid combination of different exposures from the image frame sequences having a second common frame number succeeding the first common frame number; and processing the valid combination of different exposures from the first and second camera image frame sequences to generate output data from the ISP pipeline.

20 Claims, 9 Drawing Sheets

(56) References Cited

U.S. PATENT DOCUMENTS

| | | |
|---|---|---|
| 2020/0388016 A1 | 12/2020 | Bak et al. |
| 2021/0274076 A1* | 9/2021 | Talbert ................. A61B 1/0638 |
| 2021/0337117 A1 | 10/2021 | Cai et al. |
| 2025/0030954 A1* | 1/2025 | He ....................... H04N 19/167 |

* cited by examiner

REAL TIME STREAM CAMERA ISP WITH LOOSELY COUPLED CONTROL LOOP

CROSS-REFERENCE TO RELATED APPLICATIONS

This application claims the priority under 35 U.S.C. § 119 of India Patent application No. 202341038599, filed on 5 Jun. 2023, the contents of which are incorporated by reference herein.

BACKGROUND

Field

This disclosure is directed in general to the field of image processing. In one aspect, the disclosure relates to an image signal processing apparatus, system and method for real-time image signal processing techniques.

Description of the Related Art

Computer vision systems are increasingly used in different applications (e.g., Advanced Driver Assistance System (ADAS), surveillance, inspection, security, and remote sensing systems), as well as mainstream applications (e.g., consumer digital imaging and real time video conferencing). To improve image quality in such applications, camera image signal processing pipeline (ISP) techniques are used to generate high dynamic range (HDR) images by combining multiple images with different exposure times into a single high-quality image. While raw input images captured by the camera can be stored in memory and then retrieved for HDR image processing, such memory storage and read operations increase memory system costs and processing latency while reducing memory system bandwidth (e.g., DDR). To avoid such disadvantages, camera image signal processing pipeline (ISP) components are used to deploy stream interfaces for processing raw camera stream on-the-fly without performing memory storage/read operations. While such camera ISP schemes can be deployed for a single camera system on relatively small cost MCU, the overall ISP sub-subsystem inside a system-on-chip (SoC) solution still remains a real-time critical piece of hardware requiring real-time critical DMA transfers and real-time control-loop software execution on application/control CPUs. As seen from the foregoing, the existing image signal processing are extremely difficult at a practical level by virtue of the challenges with quickly and efficiently performing image signal processing because of the difficulties of meeting the real time performance requirements when using application/control CPUs to perform memory transfers within real-time control-loop constraints.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

A real-time stream camera ISP hardware apparatus, system, architecture, methodology, and program code are described wherein one or more synchronization settings are used to configure the camera ISP hardware apparatus to identify and continuously process valid combinations of exposures that belong to same frame number coming from a camera input module. In selected embodiments, the camera ISP hardware apparatus is configured with a dual exposure VSYNCH lock (DEVL) setting to respond to a trigger by scanning for valid combinations of exposures (i.e., DCG and VS) having the same frame-number, discarding corresponding image lines during scanning, generating ISP outputs from each valid combination of exposures that belong to same frame number, and then discarding each completely scanned frame before the camera ISP hardware apparatus starts generating ISP outputs from subsequent valid combinations of exposures for the next frame number, and so on. In other selected embodiments, the camera ISP hardware apparatus is configured with a single step enable (SSEN) setting to respond to a trigger by scanning for valid combinations of exposures (i.e., DCG and VS) for a single ISI frame that is processed to generate an ISP output before processing of next frame starts, and then dropping or discarding all subsequent frames from ISP processing until a subsequent trigger is received by the ISP. In selected embodiments, the DEVL and SSEN settings can be configured individually or in combination to configure the camera ISP hardware apparatus for efficiently processing single or dual exposure operations so that the ISP pipeline can be implemented with the existing DMA and CPU resources of a single SoC solution rather than requiring a dedicated ISP-specific DMA and CPU resources of a separate SoC solution, thereby reducing the die size through reuse of existing SoC components. In addition, by using the adaptively configurable DEVL and SSEN settings to enable real-time processing of the input camera stream by the camera ISP hardware apparatus without saving input stream frames to external memory (e.g., DDR), the bandwidth requirements, power consumption, and/or memory size requirements for external memory accesses are reduced.

Figure 1:
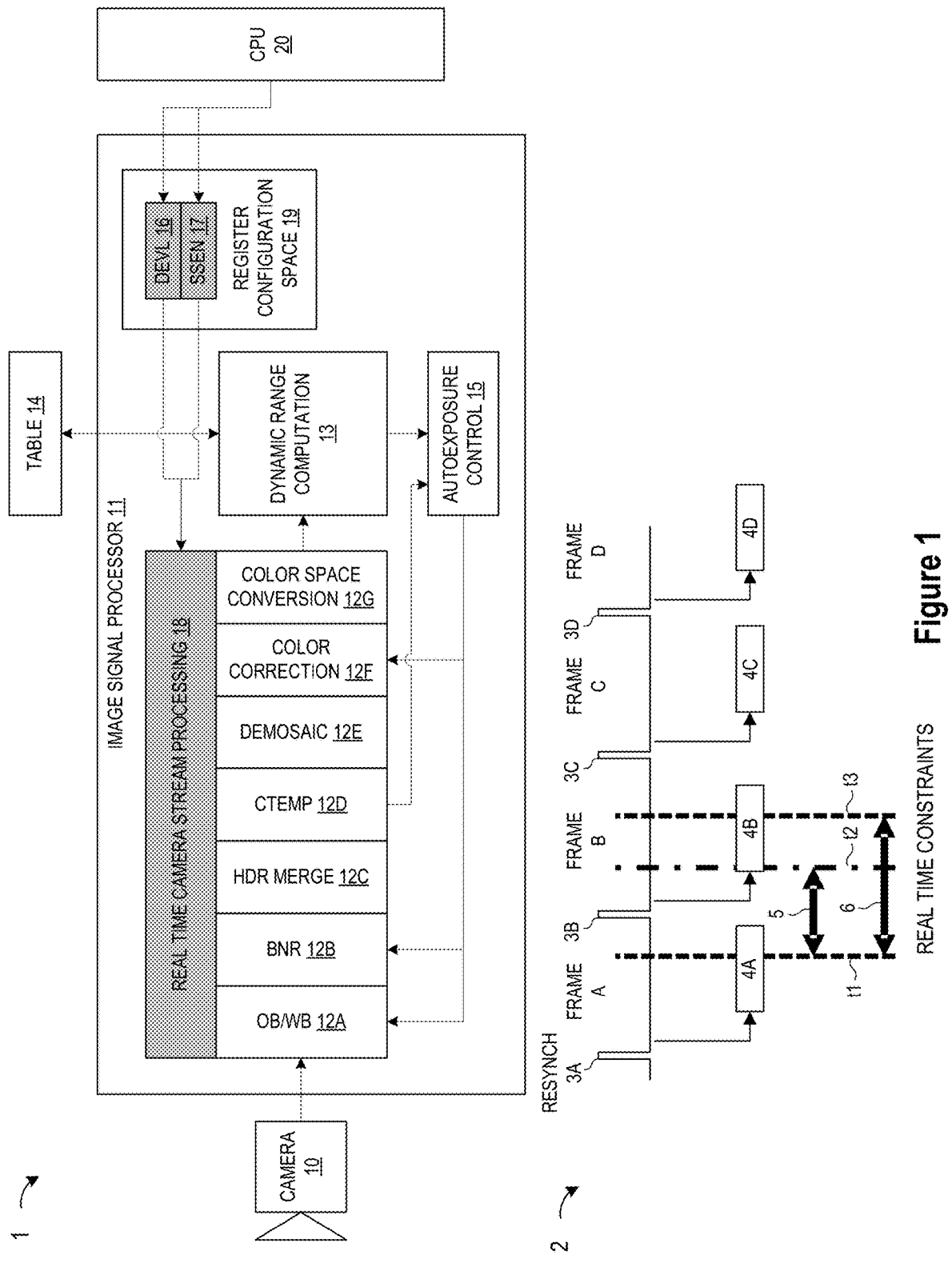
FIG. 1 depicts a simplified block diagram of a real time stream camera system employing an image signal processor with an autoexposure control unit connected in a loosely coupled control loop to process input camera stream frames from an input camera with a real time camera stream processing module in response to one or more synchronization settings in accordance with selected embodiments of the present disclosure.

To provide additional details for an improved contextual understanding of the present disclosure, reference is now made to FIG. 1 which depicts a simplified block diagram of a real time stream camera system 1 employing an image signal processor 11 with an autoexposure control unit 15 connected in a loosely coupled control loop to process input camera stream frames from an input camera 10 with a real time camera stream processing hardware/module 18 in response to one or more synchronization settings 16, 17. In selected embodiments, the input camera 10 may be a single camera or a multi-camera system, such as a Mobile Industry Processor Interface (MIPI) camera that is increasingly used with Edge or Industrial market applications and automotive market applications. As will be appreciated and described more fully hereinbelow, the input camera 10 may generate input camera data as a stream interface, which includes input image frames along with frame timing signals, such as VSYNC, HSYNC, Data-Enables, etc.

As illustrated, the image signal processor 11 also includes an autoexposure control unit 15 which may be implemented with any suitable microcontroller, such as the ARM Cortex-A53 CPU. In addition, the image signal processor 11 includes a dynamic range compression (DRC) block 13 which is configured to perform computations on the input image frames, thereby generating table entries for storage in the table 14. The image signal processor 11 also includes the autoexposure control unit 15 which is connected and configured to access the table entries from the table 14 and to calculate the image processing algorithms (e.g., the 3A algorithm) and other values used in feedback programming of the input camera 10 and/or programming the ISP configuration registers which are used by one or more of the image processing circuits 12A-G.

To process the input camera stream frames from the input camera 10, digital camera image signal processing increasingly requires Auto Exposure/While-Balance (2A) algorithms or Auto Focus/Exposure/White-Balance (3A) algorithms for camera ISP applications where ISP processing capabilities require efficient MEM-to-MEM ISP operations for multi-camera inputs and/or an additional stream interface for single camera inputs. In selected embodiments, such image processing algorithms may perform high dynamic range (HDR) image processing which combines multiple image frames with different exposure times into a single high-quality image. To this end, the real time camera stream processing hardware/module 18 is provided to implement an image signal processing pipeline (ISP) to perform a pipelined sequence of image processing operations 12A-G. For example, the real time camera stream processing hardware/module 18 may include an Optical Black/White Balance circuit (OB/WB) circuit 12A, a Bayer Noise Reduction (BNR) circuit 12B, a high dynamic range (HDR) circuit 12C, a color temperature measurement (CTEMP) circuit 12D, an image demosaic circuit 12E, a color correction circuit 12F, and a color space conversion circuit 12G. However, it will be appreciated that fewer or additional image processing circuits could be used as will be appreciated by those skilled in the art, including but not limited to a synchronization circuit, a color matrix circuit, a gamma conversion circuit, an RGB conversion circuit, an edge enhancement circuit, a noise reduction circuit, a resizing circuit, a vignetting circuit, and/or an image compression/expansion circuit, and the like. Note that, although each depicted circuit 12A-G may serially process image data along the image data flow in the view, each circuit is allowed to separately process the image data.

To avoid the memory costs for storing incoming image frames in external memory (e.g., the bandwidth requirements, power consumption, and/or memory size requirements), the real time camera stream processing hardware/module 18 may be connected with the autoexposure control unit 15 to form a loosely coupled control loop wherein the input camera stream(s) are fed directly to the ISP without saving the stream frames to external memory in order to save DDR bandwidth and power. However, there are costs and constraints from such real-time critical ISP control loops. For example and as illustrated with the timing diagram 2, each frame resynch pulse 3A-3D signal the beginning of an input image frame, and is used to trigger the ISP 11 to generate corresponding ISP outputs 4A-4D after a short startup processing delay. In an example sequence where the control loop software from the autoexposure control unit 15 working on a given frame (e.g., Frame A) to extract an image parameter or metadata value from Frame A at time t1, the autoexposure control unit 15 may require the processing time 6 to process the image parameter value for use with one or more subsequent frames (e.g., Frame B). However, given the tight periodicity of the input image frames 2, processing of the next frame (e.g., Frame B) may require a shorter processing time 5 than can be accomplished with a CPU-based software solution. As a result of the longer software-based processing time 6, the processing of the image parameter value extracted from Frame A at time t1 is not completed until time t3, which too late for use with processing of the next Frame B at time t2. Another drawback from conventional control loop solutions is that dedicated real-time efficient DMA transfers are required for the measurement parameters computed inside the ISP (e.g., statistics, histograms etc.) as well as a dedicated CPU for ISP processing. Such requirements add to the die size and costs for implementing real-time stream camera ISP processing.

Figure 2:
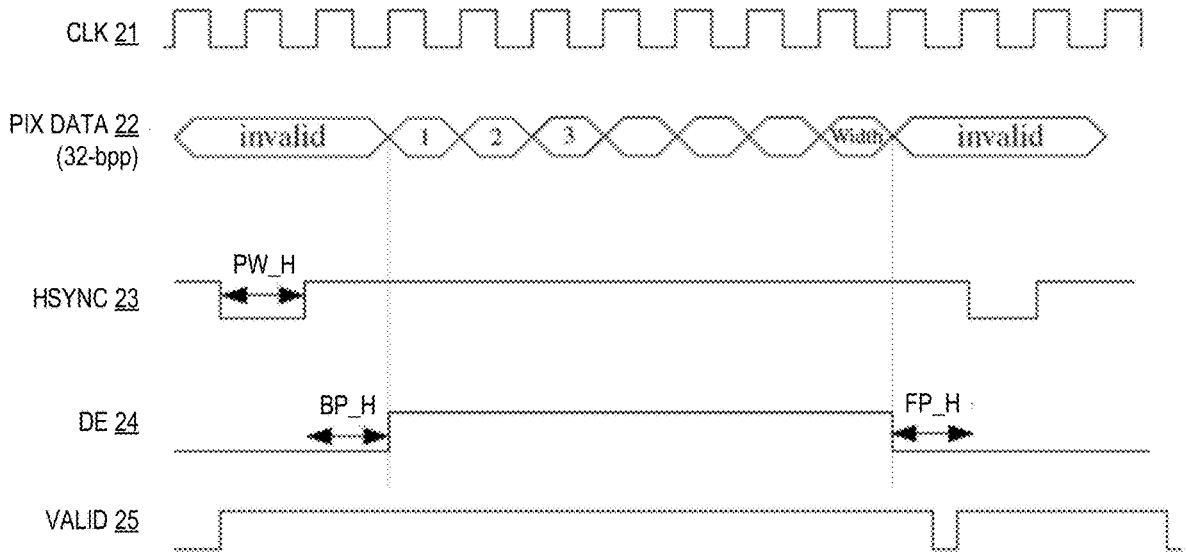
FIGS. 2-3 depict a stream interface timing diagram for bringing camera input data into an image signal processor in accordance with selected embodiments of the present disclosure.

To provide additional details for an improved contextual understanding of the present disclosure, reference is now made to FIG. 2 which depicts a first stream interface timing diagram 20 for bringing camera input data into an image signal processor. In particular, the clock signal 21 is the input clock to the image signal processor which controls the stream interface timing for processing the camera stream frames from the input camera. In addition, the pixel data signal 22 indicates the input pixel data stream which is denoted with 32 bits per pixel (bpp) which will processed as "valid" or "invalid" data, depending on the other stream interface timing signals. In particular, the horizontal synch (HSYNC) signal 23 is provided as an active low signal to identify the start of each line in the image frame with the PW_H pulse, and the data enable (DE) signal 24 is provided to signal when the pixel data signal 22 is valid. With the HSYNC signal 23 and DE signal 24 being provided to multiple ISP receivers, the valid signal 25 is provided to an individual ISP receiver to indicate that the HSYNC signal 23 and DE signal 24 are valid for processing by the ISP which receives the valid signal 25.

Figure 3:
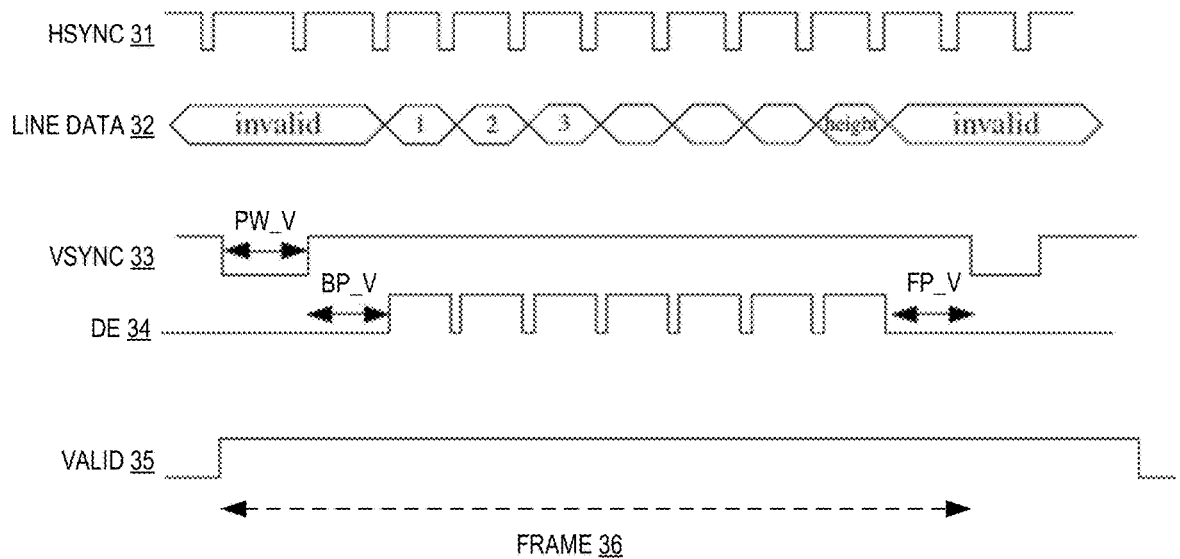

To provide additional details for an improved contextual understanding of the present disclosure, reference is now made to FIG. 3 which depicts a second stream interface timing diagram 30 for bringing camera input data into an image signal processor. In particular, the HSYNC signal 31 is the same as the HSYNC signal 23 shown in FIG. 2, but on a different time scale, and acts as a clock for the vertical synch (VSYNC) signal 33 described herein. In addition, the line data signal 32 indicates when the input lines will processed as "valid" or "invalid" lines, depending on the other stream interface timing signals. In particular, the VSYNC signal 33 is provided as an active low signal to identify the start of each new frame with the PW_V pulse, and the data enable (DE) signal 34 is provided with pulse signals to signal when the line data signal 32 is valid, where the DE pulse signals are separated from the VSYNC signal pulse 33 on the front end by the BP_V pulse duration and on the back end by the FP_V pulse duration. With the VSYNC signal 33 and DE signal 34 being provided to multiple ISP receivers, the valid signal 35 is provided to an individual ISP receiver to indicate that the VSYNC signal 33 and DE signal 34 are valid for processing by the ISP which receives the valid signal 35.

As seen from the depicted channel stream interface (CSI) timing diagrams of FIGS. 2-3, a single frame 36 is captured by the camera under control of the control signals 31-35, where the VSYNC signal 33 provides a start-of-frame signal for the frame 36 and where the HSYNC signal 31 and data enable signal 34 combine to validate the input line data signal 32 for each line of the frame 36. Subsequent frames are also captured with corresponding control signaling. In addition, it will be appreciated that a camera may employ the same control signaling to capture or generate multiple frame images of the same scene, albeit with different exposures. For example, a first image frame captured from a scene may be a dual conversion gain (DCG) exposure, and a second image frame captured from the same scene may be a very short (VS) exposure. Due to differing image processing requirements at the camera for the different types of exposures, the channel stream interface timing for different frame exposures may be slightly shifted from one another.

As will be appreciated, the channel stream interface status of the camera must be coordinated or synchronized with the operation of the image signal processor 11 to ensure that incoming input camera stream frames from the input camera 10 can be in received and processed by the ISP 11. However, there are a number of challenges with coordinating the reception and processing of frames from the channel stream interface. For example and as noted above, there can be timing offsets between the reception of different frame exposures of the same scene. In addition, the channel stream interface could be in any state (i.e., active or inactive) when the ISP 11 is configured and triggered. Yet another challenge arises from the real time constraints (described above) imposed by using an ISP control feedback loop to implement real-time stream camera image signal processing.

To address these challenges with coordinating the reception of frames from the channel stream interface for processing by the ISP with relaxed time constraints, the real time stream camera system 1 may be configured with one or more synchronization settings 16, 17 which are set by the host CPU 20 to control the real time camera stream processing hardware/module 18 to identify and continuously process valid combinations of exposures that belong to same frame number coming from a camera input module. In selected embodiments, the real time stream camera system 1 includes a register configuration space 19 which is configured by the CPU 20 with a dual exposure VSYNCH lock (DEVL) setting 16 to configure the image signal processing hardware apparatus 11 to respond to a trigger by scanning for valid combinations of exposures (i.e., DCG and VS) having the same frame-number, discarding corresponding image lines during scanning, generating ISP outputs from each valid combination of exposures that belong to same frame number, and then discarding each completely scanned frame before the camera ISP hardware apparatus starts generating ISP outputs from subsequent valid combinations of exposures for the next frame number, and so on.

Figure 4:
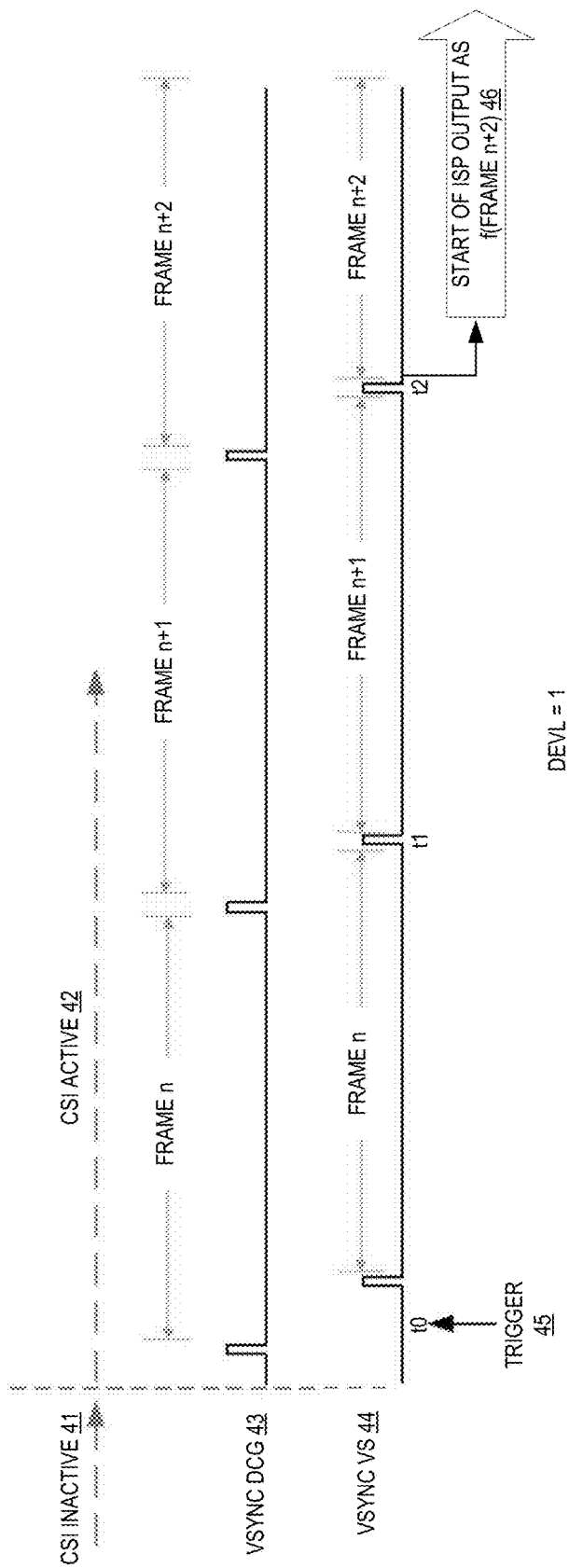
FIG. 4 is a timing diagram illustration of an ISP output which is generated when a trigger is received while the channel stream interface is active and a dual exposure VSYNC lock value is set in accordance with first selected embodiments of the present disclosure.

To provide additional details for an improved understanding of selected embodiments of the present disclosure, reference is now made to FIG. 4 which is a timing diagram 40 illustrating how an ISP output 46 is generated by locking two different exposure frame sequences 43, 44 in response to a trigger 45 that is received while the channel stream interface is active and a dual exposure VSYNC lock (DEVL) value is set to a first value (e.g., DEVL=1). In this depicted example, the ISP 11 is operationally configured with the DEVL value (e.g., DEVL=1) and the channel stream interface shifts from an "inactive" state (e.g., CSI Inactive) 41 to an "active" state (e.g., CSI Active) 42 when the trigger signal 45 is received at time t0. In this operational mode, the ISP 11 must be enabled to process valid combinations of exposures that belong to the same frame number coming from the input camera 10. In the depicted example, a first sequence of image frames 43 may be dual conversion gain (DCG) exposures, and a second sequence of image frames 44 may be very short (VS) exposures.

At time t0, the trigger 45 issues while CSI is active and just after the first VSYNC DCG frame started, so "Frame n" from the VSYNC DCG sequence 43 is already underway before the trigger. At time t1, the ISP system cannot detect complete VSYNC DCG and VSYNC VS frames for "Frame n" because only part of "Frame n" from the VSYNC DCG sequence 43 was detected. In addition, the ISP system cannot detect complete VSYNC DCG and VSYNC VS frames for "Frame n+1" because "Frame n+1" from the VSYNC DCG sequence 43 has only begun streaming. At time t2, the ISP system can detect complete VSYNC DCG and VSYNC VS frames for "Frame n+1" because both have been received in their entirety, at which point a lock for both the VSYNC DCG "Frame n+1" and the VSYNC VS "Frame n+1" is detected. Only after the lock is detected does the ISP system start the ISP output 46 which is computed from the VSYNC DCG "Frame n+2" and the VSYNC VS "Frame n+2." As a result, when enabled with the DEVL field, the ISP 11 scans incoming frame sequences 43, 44 for valid exposure combinations (i.e., DCG and VS) of the same frame-number to detect receipt two full frames of different exposures. While in the frame detection scanning mode, the ISP 11 discards the corresponding image lines without generating the ISP output 46, but once the complete frames for two different exposures are scanned, the ISP 11 starts processing from the next frame (e.g., Frame n+3, etc.) to generate the ISP output 46. All subsequent frames are processed and output as desired.

While the ISP system can perform frame tracking by detecting when all horizontal lines of a frame have been received, this may constrain the ability of the ISP system to process the frame data with sufficient time to enable processing of subsequent frames. Accordingly, selected embodiments of the ISP system may be configured to perform frame tracking by detecting when a predetermined portion of the horizontal lines of a frame have been received. For example, an internal counter at the ISP system may be incremented with each HSYNC pulse, and when half of frame height is detected from the HSYNC pulse count, this may be used to signal that a "full" frame has been detected.

Figure 5:
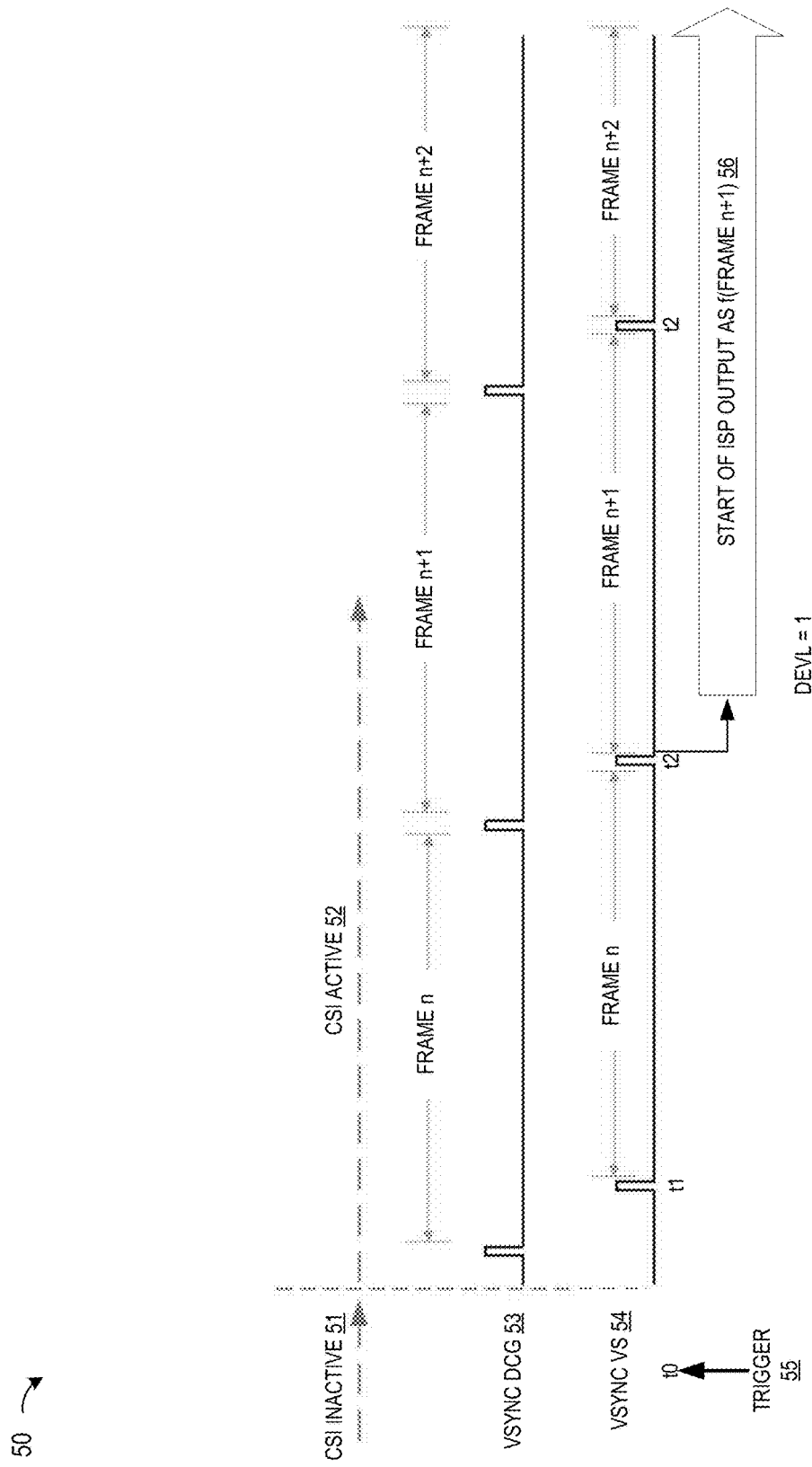
FIG. 5 is a timing diagram illustration of an ISP output which is generated when a trigger is received while the channel stream interface is inactive and a dual exposure VSYNC lock value is set in accordance with second selected embodiments of the present disclosure.

To provide additional details for an improved understanding of selected embodiments of the present disclosure, reference is now made to FIG. 5 which is a timing diagram 50 illustrating how an ISP output 56 is generated by locking two different exposure frame sequences in response to a trigger 55 that is received while the channel stream interface is inactive and a dual exposure VSYNC lock (DEVL) value is set to a first value (e.g., DEVL=1). In this depicted example, the ISP 11 is operationally configured with the DEVL value (e.g., DEVL=1) and the channel stream interface shifts from an "inactive" state (e.g., CSI Inactive) 51 to an "active" state (e.g., CSI Active) 52 after the trigger signal 55 is received at time t0. In this operational mode, the ISP 11 must be enabled to process valid combinations of exposures that belong to the same frame number coming from the input camera 10. In the depicted example, a first sequence of image frames 53 may be dual conversion gain (DCG) exposures, and a second sequence of image frames 54 may be very short (VS) exposures.

At time t0, the trigger 55 issues while CSI is inactive and before the first VSYNC DCG frame starts, so "Frame n" from the VSYNC DCG sequence 53 has not started. At time t1, the ISP system cannot detect complete VSYNC DCG and VSYNC VS frames for "Frame n" because only part of "Frame n" from the VSYNC DCG sequence 53 was detected. At time t2, the ISP system can detect complete VSYNC DCG and VSYNC VS frames for "Frame n" because both have been received in their entirety, at which point a lock for both the VSYNC DCG "Frame n" and the VSYNC VS "Frame n" is detected. Only after the lock is detected does the ISP system start the ISP output 56 which is computed from the VSYNC DCG "Frame n+1 and the VSYNC VS "Frame n+1." In this way, when enabled with the DEVL field, the ISP 11 incoming frame sequences 53, 54 for valid exposure combinations (i.e., DCG and VS) of the same frame-number to detect receipt two full frames of different exposures. While in the frame detection scanning mode, the ISP 11 discards the corresponding image lines without generating the ISP output 56, but once the complete frames for two different exposures are scanned, the ISP 11 starts processing from the next frame (e.g., Frame n+2, Frame n+3, etc.) to generate the ISP output 56. All subsequent frames are processed and output as desired. As described hereinabove, the ISP system can perform frame tracking by detecting when all horizontal lines of a frame, or a predetermined portion of the lines of a frame, have been received.

Figure 6:
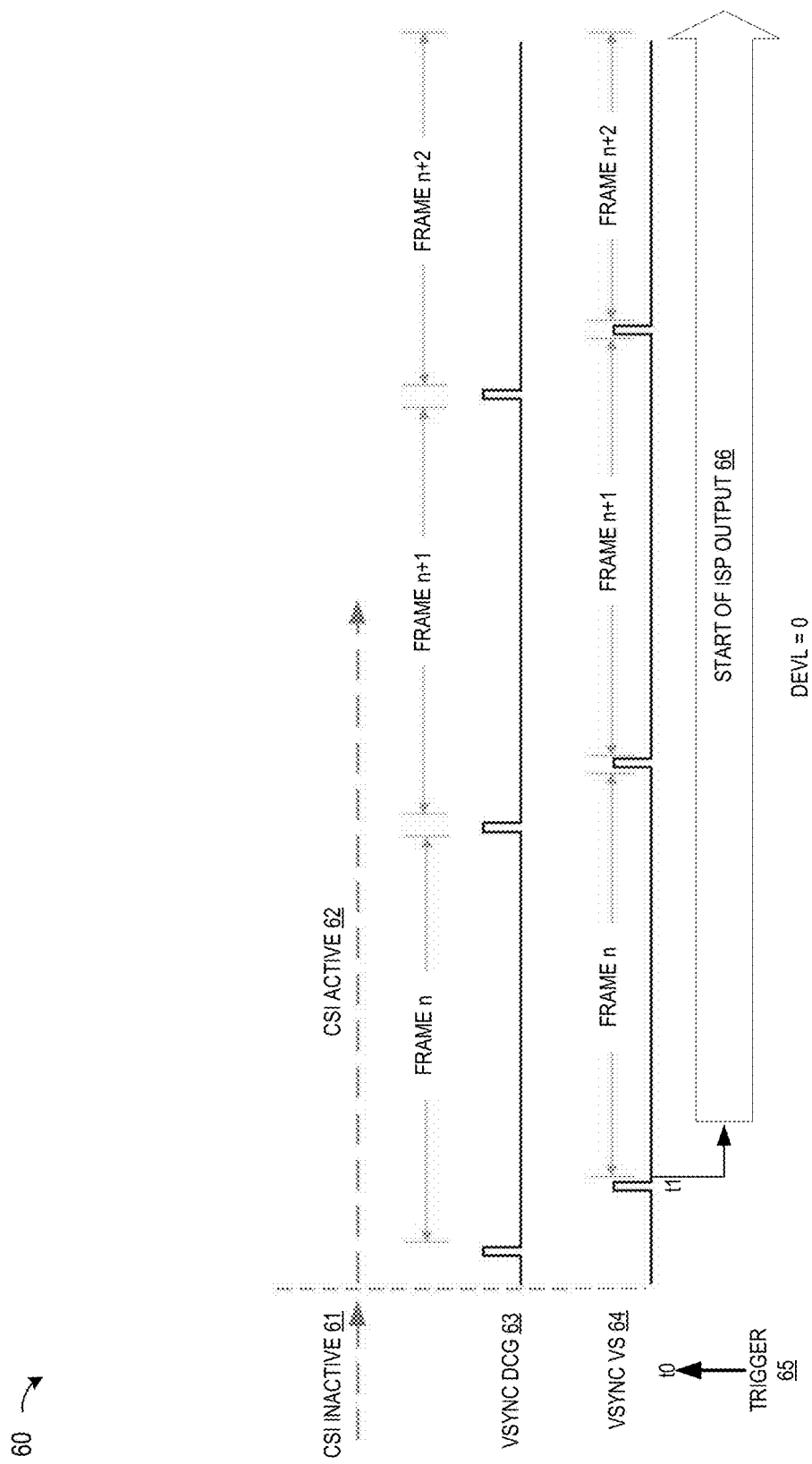
FIG. 6 is a timing diagram illustration of an ISP output which is generated when a trigger is received while the channel stream interface is active and a dual exposure VSYNC lock value is reset in accordance with third selected embodiments of the present disclosure.

To provide additional details for an improved understanding of selected embodiments of the present disclosure, reference is now made to FIG. 6 which is a timing diagram 60 illustrating how an ISP output 66 is generated without first locking two full frames from different exposure frame sequences 63, 64. In this mode, the CPU 20 has first ensured that the ISP 11 is only triggered when the CSI is active 62, but this mode does not allow a restart of the ISP 11. As depicted, a trigger 65 is received while the channel stream interface is inactive 61 and while a dual exposure VSYNC lock (DEVL) value is set to a second value (e.g., DEVL=0). Once the channel stream interface is active 62, the ISP 11 is enabled to immediately start processing valid combinations of exposures 63, 64 that belong to the same frame number coming from the input camera 10. In particular, the trigger 65 issues at time t0 while the CSI is inactive 61, and in response to the CSI becoming active 62, the ISP 11 starts generating the ISP output 66 at time t1 from "Frame n" of the VSYNC DCG sequence 63 and the VSYNC VS sequence 64, even before two full frames have been detected.

Figure 7:
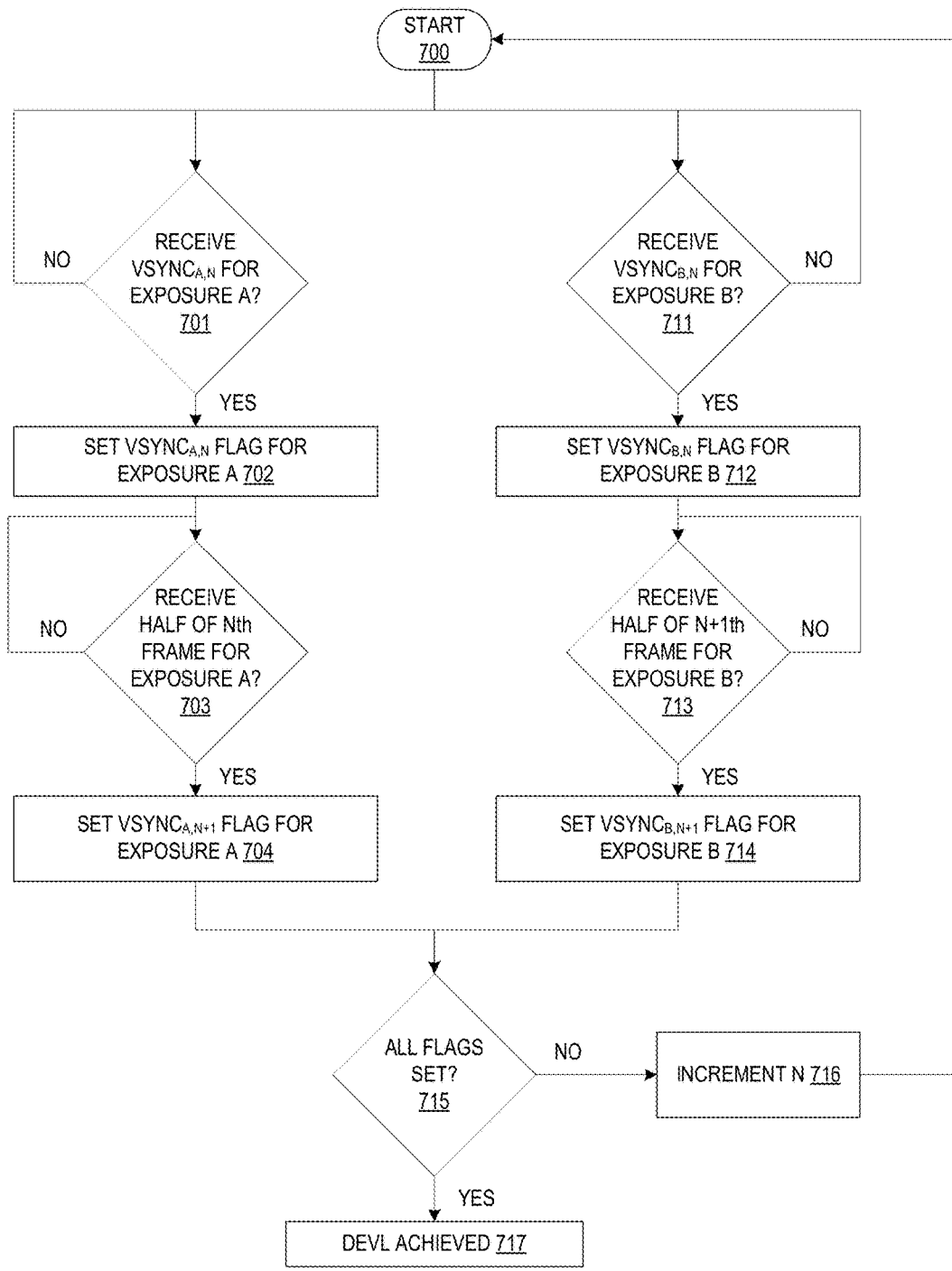
FIG. 7 illustrates a simplified flow chart showing the logic for achieving a dual exposure VSYNC lock in accordance with selected embodiments of the present disclosure.

To provide additional details for an improved understanding of selected embodiments of the present disclosure, reference is now made to FIG. 7 which depicts a simplified flow chart diagram 70 showing the logic for achieving a dual exposure VSYNC lock, such as may be used by a real-time camera stream processing hardware unit in an image signal processing unit and/or computer system. In the flow diagram 70, the method starts at step 700 when the real-time camera stream processing hardware unit receives a trigger while the channel stream interface (CSI) is either active or inactive. Once the CSI activates, two or more different exposure frame sequences are received from the camera and separately processed in parallel processing sequences by the real-time camera stream processing hardware unit.

In a first processing sequence 701-704, the real-time camera stream processing hardware unit monitors a first exposure frame sequence (Exposure A) to detect reception of a first VSYNC pulse signal (VSYNCA,N) at step 701. If the first VSYNC pulse signal (VSYNCA,N) is not received, the detection processing continues (as indicated by negative outcome from step 701). However, upon detection of the first VSYNC pulse signal (VSYNCA,N), this indicates that a "start of frame" for the Nth frame has been received (as indicated by affirmative outcome from step 701), and a first corresponding flag is then set at step 702, such as by setting a VSYNCA,N flag for Exposure A. Next in the first processing sequence, the real-time camera stream processing hardware unit scans the first exposure frame sequence (Exposure A) at step 703 to detect reception of the incoming frame (e.g., Frame N) in the first exposure frame sequence (Exposure A). For example, the scanning step 703 may detect when a first predetermined portion of the incoming frame (e.g., Frame N) has been received, such as by counting the number of received frame lines (indicated by received HSYNC pulses) for the Nth frame of the first exposure frame sequence (Exposure A) to detect when half of the Nth frame for Exposure A has been received. If the required portion of the Nth frame for Exposure A is not received, the scanning process continues (as indicated by negative outcome from step 703). However, upon detection of the required portion of the Nth frame for Exposure A (as indicated by affirmative outcome from step 703), a second corresponding flag is then set at step 704, such as by setting a VSYNCA,N+1 flag for Exposure A.

In parallel with the first processing sequence 701-704, the real-time camera stream processing hardware unit performs a second processing sequence 711-714, though in selected embodiments, the second processing sequence 711-714 may be performed in whole or in part before or after the first processing sequence 701-704. As depicted, the second processing sequence 711-714 starts by monitoring a second exposure frame sequence (Exposure B) to detect reception of a second VSYNC pulse signal (VSYNCB,N) at step 711. If the second VSYNC pulse signal (VSYNCB,N) is not received, the detection processing continues (as indicated by negative outcome from step 711). However, upon detection of the second VSYNC pulse signal (VSYNCB,N), this indicates that a "start of frame" for the Nth frame has been received (as indicated by affirmative outcome from step 711), and a third corresponding flag is then set at step 712, such as by setting a VSYNCB,N flag for Exposure B. Next in the second processing sequence, the real-time camera stream processing hardware unit scans the second exposure frame sequence (Exposure B) at step 713 to detect reception of the incoming frame (e.g., Frame N) in the second exposure frame sequence (Exposure B). For example, the scanning step 713 may detect when a first predetermined portion of the incoming frame (e.g., Frame N) has been received, such as by counting the number of received frame lines (indicated by received HSYNC pulses) for the Nth frame of the second exposure frame sequence (Exposure B) to detect when half of the Nth frame for Exposure B has been received. If the required portion of the Nth frame for Exposure B is not received, the scanning process continues (as indicated by negative outcome from step 713). However, upon detection of the required portion of the Nth frame for Exposure B (as indicated by affirmative outcome from step 713), a fourth corresponding flag is then set at step 714, such as by setting a VSYNCB,N+1 flag for Exposure B.

At step 715, the real-time camera stream processing hardware unit determines if two "full" frames from the different exposure frame sequences (Exposures A, B) have been received by detecting if all of the flags have been set. In particular, the first through fourth flags are checked at this time. If all flags have not been set (as indicated by negative outcome from step 715), this indicates that two "full" frames from the different exposure frame sequences (Exposures A, B) have not been received for Frame N, so the counter value N is then incremented at step 716, and the process returns to restart at step 701 where the next incoming frames (effectively, Frame N+1) from the different exposure frame sequences (Exposures A, B) are assessed with the first and second processing sequences 701-714, 711-714. However, upon detecting all of the required flags have been set (as indicated by affirmative outcome from step 715), then the dual exposure VSYNCH lock has been achieved between the different exposure frame sequences (Exposures A, B) at step 717, at which time the real-time camera stream processing hardware unit is configured to generate the ISP output, starting by processing "Frame N+1" of the different exposure frame sequences (Exposures A, B) and then continuously processing subsequent frames (e.g., Frame N+2, Frame N+3, etc.) as needed. In addition, the generated ISP output may be saved as embedded data in memory. For example, an id-based or line based identification mechanism may be used for embedded data that is stored or saved with the ISP output in memory. In selected embodiments, the embedded data has frame-specific parameters, such as frame number, analog gains of sensor, etc.

In addition to using the dual exposure VSYNCH lock mechanism to address the challenges with coordinating the reception of frames from the channel stream interface described hereinabove, the real time stream camera system 1 may be configured with a single step enable (SSEN) setting 17 to respond to a trigger by scanning for valid combinations of exposures (i.e., DCG and VS) for a single ISI frame that is processed to generate an ISP output before processing of next frame starts, and then dropping or discarding all subsequent frames from ISP processing until a subsequent trigger is received by the ISP. In such embodiments, the real time stream camera system 1 includes a register configuration space 19 which is configured by the CPU 20 with a SSEN setting 17 to configure the image signal processing hardware apparatus 11 to respond to a trigger by scanning for valid combinations of exposures (i.e., DCG and VS) having the same frame-number, discarding corresponding image lines during scanning, generating an ISP output from each valid combination of exposures that belong to a single frame number, and then stopping the generation of ISP outputs from subsequent frames.

Figure 8:
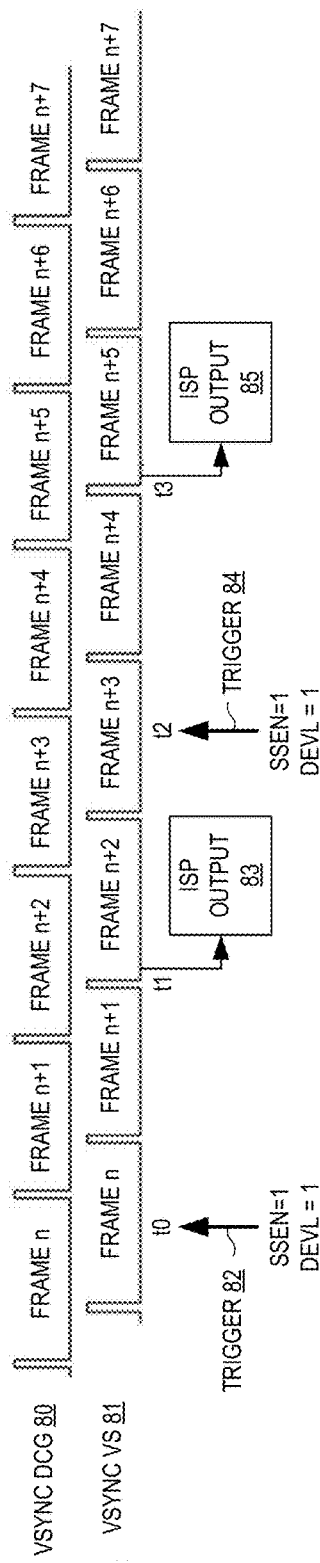
FIG. 8 is a timing diagram illustration of ISP outputs which are generated from a dual exposure camera when a dual exposure VSYNC lock value and a single step frame value are both set in accordance with selected dual exposure camera embodiments of the present disclosure.

To provide additional details for an improved understanding of selected embodiments of the present disclosure, reference is now made to FIG. 8 which is a timing diagram 80 illustration of an embodiment where ISP outputs 83, 85 are generated, respectively, in response to triggers 82, 84 from a dual exposure camera when a dual exposure VSYNC lock value and a single step frame value are both set. In this depicted example, the ISP 11 is operationally configured with the DEVL and SSEN values being to a first value (e.g., DEVL=SSEN=1) and the channel stream interface is an "active" state when a first trigger signal 82 is received at time t0. In this operational mode, the ISP 11 is enabled to generate and ISP output by processing valid combinations of exposures that belong to the same frame number coming from the input camera 10, but each ISP output is generated by processing only a single frame from the valid combinations of exposures. In the depicted example, a first sequence of image frames 80 may be dual conversion gain (DCG) exposures, and a second sequence of image frames 81 may be very short (VS) exposures.

As depicted in FIG. 8, the trigger 82 issues at time to while CSI is active and in the middle of the first frame ("Frame n") from the VSYNC DCG sequence 80 and the VSYNC VS sequence 81. By virtue of the DEVL setting (DEVL=1), the ISP system cannot detect complete VSYNC DCG and VSYNC VS frames for "Frame n" at time to because only part of "Frame n" from the VSYNC DCG sequence 80 and the VSYNC VS sequence 81 was detected; however, at time t1, the ISP system can detect complete VSYNC DCG and VSYNC VS frames for "Frame n+1" because both have been received in their entirety, at which point a dual lock for both the VSYNC DCG "Frame n+1" and the VSYNC VS "Frame n+1" is detected. Only after detecting the dual lock does the ISP system start the ISP output 83 which is computed from the VSYNC DCG "Frame n+2" and the VSYNC VS "Frame n+2." However, by virtue of the SSEN setting (SSEN=1), the ISP 11 stops generating the ISP output 83, and all subsequent frames are dropped by the ISP system until the next trigger 84 is received and the process restarts. In particular, when the second trigger 84 issues at time t2 in the middle of the fourth frame ("Frame n+3") from the VSYNC DCG sequence 80 and the VSYNC VS sequence 81, the ISP system cannot detect complete VSYNC DCG and VSYNC VS frames for "Frame n+3" by virtue of the DEVL setting (DEVL=1). However, at time t3, the ISP system can detect complete VSYNC DCG and VSYNC VS frames for "Frame n+4" because both have been received in their entirety, at which point a dual lock for both the VSYNC DCG "Frame n+4" and the VSYNC VS "Frame n+4" is detected. Only after detecting the dual lock does the ISP system start the ISP output 85 which is computed from the VSYNC DCG "Frame n+5" and the VSYNC VS "Frame n+5." However, by virtue of the SSEN setting (SSEN=1), the ISP 11 stops generating the ISP output 85, and all subsequent frames are dropped by the ISP system until the next trigger is received and the process restarts.

Figure 9A:
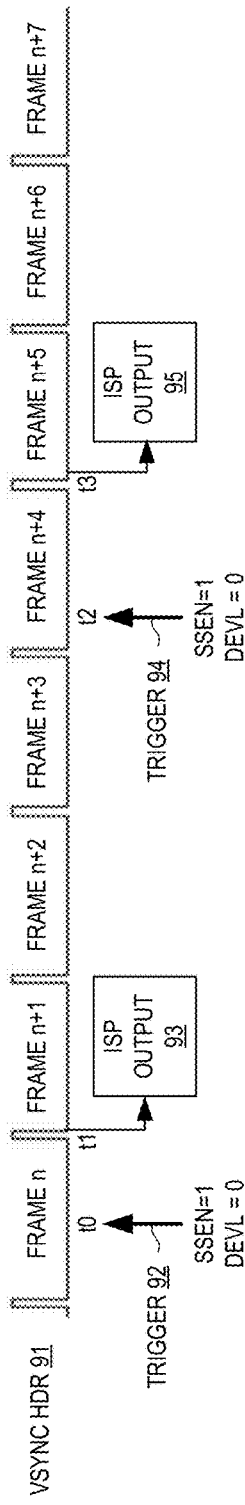
FIG. 9A is a timing diagram illustration of ISP outputs which are generated from an HDR camera when a dual exposure VSYNC lock value and a single step frame value are both set in accordance with selected HDR camera embodiments of the present disclosure.

To provide additional details for an improved understanding of selected embodiments of the present disclosure, reference is now made to FIG. 9A which is a timing diagram 90A illustration of an embodiment where ISP outputs 93, 95 are generated, respectively, in response to triggers 92, 94 from an HDR camera when a dual exposure VSYNC lock value is reset and a single step frame value is set. In this depicted example, the ISP 11 is operationally configured with the reset DEVL value (DEVL=0) and the set SSEN value (SSEN=1) and the channel stream interface is an "active" state when a first trigger signal 92 is received at time t0 during reception of the sequence of VSYNC HDR pulses 91. In this operational mode, the ISP 11 is enabled to generate an ISP output at the next frame received from the input camera 10, but each ISP output is generated by processing only a single frame from the CSI sequence of HDR image frames. As depicted in FIG. 9A, the trigger 92 issues at time to while CSI is active and in the middle of the first frame ("Frame n") from the VSYNC HDR sequence 91. By virtue of the DEVL setting (DEVL=0), the ISP system does not wait for detection of a full frame, so at time t1, the ISP system starts the ISP output 93 which is computed from the VSYNC HDR "Frame n+1." However, by virtue of the SSEN setting (SSEN=1), the ISP 11 stops generating the ISP output 93 after the VSYNC HDR "Frame n+1," and the ISP 11 may perform a save/restore on the local memory before processing of the next frame starts. In addition, the ISP 11 is configured by the SSEN setting (SSEN=1) so that all subsequent frames are dropped until the next trigger 94 is received and the process restarts. In particular, when the second trigger 94 issues at time t2 in the middle of the fifth frame ("Frame n+4") from the VSYNC HDR sequence 91, the ISP system starts generating the ISP output 95 which is computed from the VSYNC HDR "Frame n+5" without waiting for detection of a full frame. And by virtue of the SSEN setting (SSEN=1), the ISP 11 stops generating the ISP output 95, and all subsequent frames are dropped by the ISP system until the next trigger is received and the process restarts.

Figure 9B:
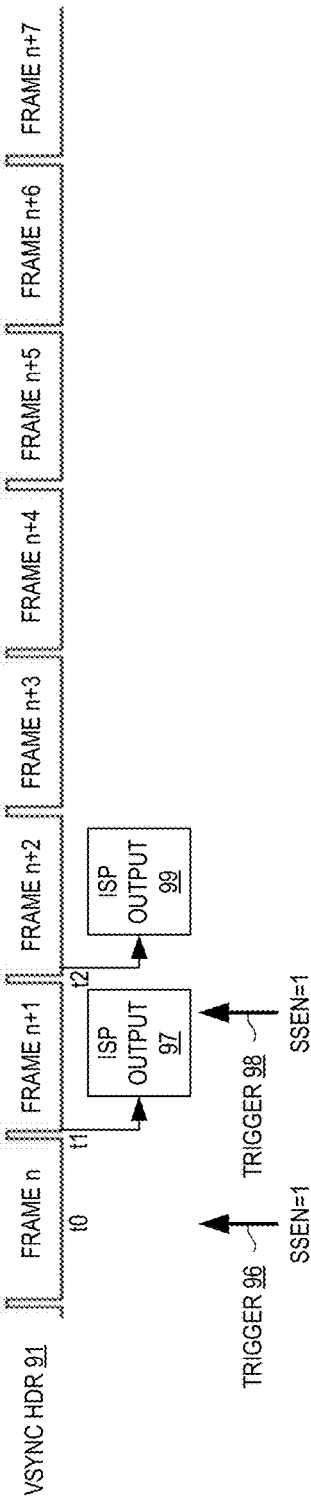
FIG. 9B is a timing diagram illustration of ISP outputs which are generated from an HDR camera when a single step frame value is set in accordance with selected back-to-back frame processing embodiments of the present disclosure.

To provide additional details for an improved understanding of selected back-to-back frame processing embodiments the present disclosure, reference is now made to FIG. 9B which is a timing diagram 90B illustration of an embodiment where ISP outputs 97, 99 are generated, respectively, in response to triggers 96, 98 from an HDR camera when a dual exposure VSYNC lock value is reset and a single step frame value is set. In this depicted example, the ISP 11 is operationally configured with the reset DEVL value (DEVL=0) and the set SSEN value (SSEN=1) and the channel stream interface is an "active" state when a first trigger signal 97 is received at time t0 during reception of the sequence of VSYNC HDR pulses 91. In this operational mode, the ISP 11 is enabled to generate an ISP output at the next frame received from the input camera 10, but each ISP output is generated by processing only a single frame from the CSI sequence of HDR image frames. As depicted in FIG. 9B, the trigger 96 issues at time t0 while CSI is active and in the middle of the first frame ("Frame n") from the VSYNC HDR sequence 91. By virtue of the DEVL setting (DEVL=0), the ISP system does not wait for detection of a full frame, so at time t1, the ISP system starts the ISP output 97 which is computed from the VSYNC HDR "Frame n+1." However, by virtue of the SSEN setting (SSEN=1), the ISP 11 stops generating the ISP output 97 after processing the VSYNC HDR "Frame n+1," but when the back-to-back trigger 98 is received at time t2 in the middle of the second frame ("Frame n+1") from the VSYNC HDR sequence 91, the ISP system starts generating the ISP output 99 which is computed from the VSYNC HDR "Frame n+2" without waiting for detection of a full frame. And by virtue of the SSEN setting (SSEN=1), the ISP 11 stops generating the ISP output 99, and all subsequent frames are dropped by the ISP system until the next trigger is received and the process restarts.

Figure 10:
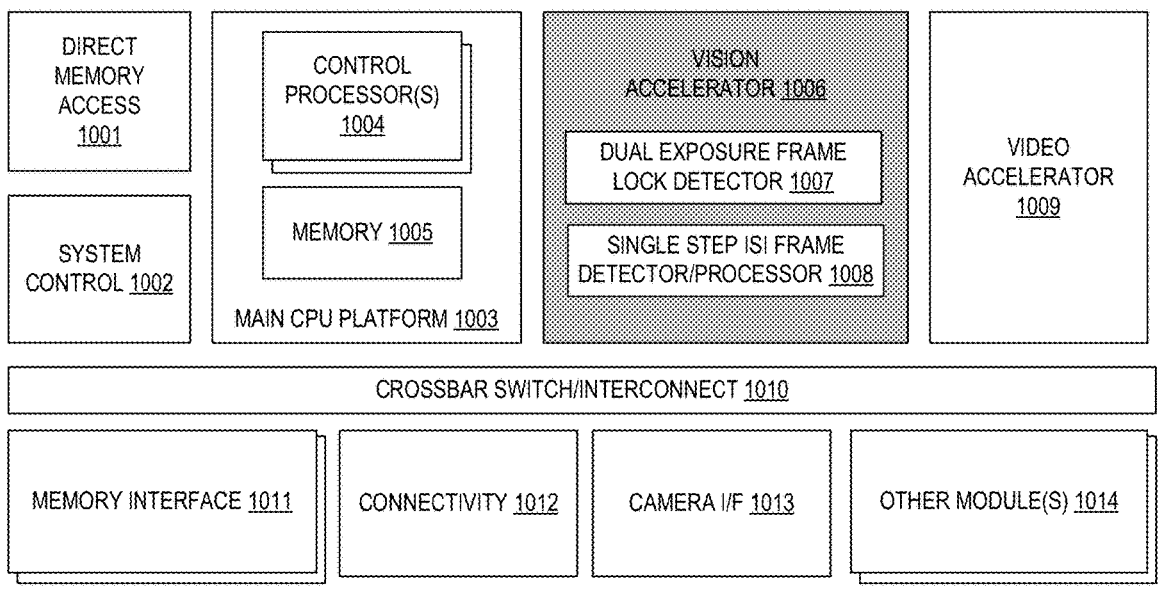
FIG. 10 illustrates schematically depicts a block diagram of a computer system in accordance with selected embodiments of the present disclosure.

To provide additional details for an improved understanding of selected embodiments of the present disclosure, reference is now made to FIG. 10 which illustrates a simplified architectural block diagram of a microcontroller system 100 for automotive and industrial high-performance radar applications which implements a real-time stream camera image signal processor with a loosely coupled control loop. As depicted, the microcontroller system 100 includes a direct memory access (DMA) block 1001, a system control block 1002, a main CPU platform 1003, a vision accelerator block 1005, and a video accelerator 1009. In the main CPU platform 1003, one or more control processor or central processing unit (CPU) subsystems 1004 and on-chip memory 1005 (e.g., volatile or non-volatile memory) are provided. In addition, the vision accelerator block 1006 may include a dual exposure frame lock detector 1007 which enables the vision accelerator 1006 to generate ISP outputs by identifying and continuously process valid combinations of exposures that belong to same frame number coming from a camera interface module 1013 after detecting a corresponding full frame from each of the plurality of different exposure frame sequences in response to a predetermined VSYNCH lock (DEVL) setting. In addition, the vision accelerator block 1005 may include a single step ISI frame detector/processor 1008 which enables the vision accelerator 1006 to generate ISP outputs from a single set of corresponding frames coming from the camera interface module 1013 in response to a predetermined SSEN lock setting.

The DMA block 1001, system control block 1002, main CPU platform 1003, vision accelerator block 1005, and video accelerator 1009 may be connected over an on-chip interconnect 1010 to a memory interface 1011, (e.g., DDR interface), one or more connectivity modules 1012 (e.g., PCIe 2x, FlexPWM, eTimer, IIC, DSPI, etc.), a camera interface module 1013, and other modules 1014. In selected embodiments, the microcontroller system 100 may be implemented as circuitry on a single integrated circuit or system-on-chip (SoC). In addition, the interconnect 1010 can be any type of bus structure, including but not limited to a non-coherent interconnect, an advanced high-performance bus (AHB), or an advanced peripheral bus (APB). In addition, the control processor(s) 1004 may be any type of processing circuit, including but not limited to a microprocessor (MPU), microcontroller (MCU), digital signal processor (DSP), or another type of processor or processor core with multiple levels of cache memory. Though not shown, the microcontroller system 100 may include peripheral devices or special-purpose processors, communication interfaces, timers, encoders/decoders, and one or more external memory interfaces, such as DDR interface or flash interface. In turn, the external memory interface(s) 1011 may be connected to external memory, such as DDR memory or flash memory.

As disclosed, the microcontroller system 100 may use the control processor(s) 1004 to configure DEVL and SSEN register settings at the vision accelerator 1006 individually or in combination to configure the vision accelerator 1006 for efficiently processing single or dual exposure operations so that ISP pipeline operations can be implemented with the existing DMA 1001 and control processor 1004 resources of a single SoC solution rather than requiring a dedicated ISP-specific DMA and CPU resources of a separate SoC solution, thereby reducing the die size through reuse of existing SoC components. In addition, by using the adaptively configurable DEVL and SSEN register settings at the vision accelerator 1006 to enable real-time processing of the input camera stream at the vision accelerator 1006 without saving input stream frames to external memory (e.g., DDR), the bandwidth requirements, power consumption, and/or memory size requirements for external memory accesses are reduced The term "module" may be defined to include a number of executable modules. The modules may include software, hardware or some combination thereof executable by a processor, such as the control processor(s) 1004. Software modules may include instructions stored in memory, such as memory 1005, or another memory device, that may be executable by the control processor(s) 1004 or other processor. Hardware modules may include various devices, components, circuits, gates, circuit boards, and the like that are executable, directed, and/or controlled for performance by the control processor(s) 1004.

A computer readable medium or machine readable medium may include any non-transitory memory device that includes or stores software for use by or in connection with an instruction executable system, apparatus, or device. The machine readable medium may be an electronic, magnetic, optical, electromagnetic, infrared, or semiconductor system, apparatus, or device. Examples may include a portable magnetic or optical disk, a volatile memory such as Random Access Memory "RAM", a read-only memory "ROM", or an Erasable Programmable Read-Only Memory "EPROM" or Flash memory. A machine readable memory may also include a non-transitory tangible medium upon which software is stored. The software may be electronically stored as an image or in another format (such as through an optical scan), then compiled, or interpreted or otherwise processed.

As will be appreciated, the term "computer readable medium" may include a single medium or multiple media, such as a centralized or distributed database, and/or associated caches and servers that store one or more sets of instructions. The computer readable medium may also include any medium that is capable of storing, encoding or carrying a set of instructions for execution by a processor or that cause a computer system to perform any one or more of the methods or operations disclosed. The computer readable medium may be non-transitory, and may be tangible. In addition, the computer readable medium may include a solid-state memory, such as a memory card or other package that houses one or more non-volatile read-only memories. The computer readable medium may be a random access memory or other volatile re-writable memory. The computer readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. As will be appreciated, any one or more of a computer readable medium or a distribution medium and other equivalents and successor media may be included for storing data or instructions.

In selected embodiments, the vision accelerator 1006 may be implemented with dedicated hardware, such as application specific integrated circuits, programmable logic arrays and other hardware devices, which may be constructed to implement various parts of the system. Applications that may include the apparatus and systems can broadly include a variety of electronic and computer systems. One or more examples described may implement functions using two or more specific interconnected hardware modules or devices with related control and data signals that can be communicated between and through the modules, or as portions of an application-specific integrated circuit. The system described may be include software programs executable by a computer system. Implementations can include distributed processing, component/object distributed processing, and parallel processing. Alternatively, virtual computer system processing can be constructed to implement various parts of the system.

By now it should be appreciated that there has been provided an apparatus, method, program code, and system for performing on-the-fly camera image processing. In the disclosed embodiments, a first processing circuit in a system-on-chip (SoC) configures one or more synchronization settings in a configuration register memory. In addition, an image signal processing (ISP) pipeline is connected in a control feedback loop in the SoC, and is configured by a first synchronization setting having a first value to process first and second camera image frame sequences having, respectively, first and second specified exposures to detect a set of complete frames from the first and second camera image frame sequences which have a first common frame number. In addition, the ISP pipeline identifies a valid combination of different exposures from the first and second camera image frame sequences having a second common frame number succeeding the first common frame number. Finally, the ISP pipeline processes the valid combination of different exposures from the first and second camera image frame sequences to generate output data from the ISP pipeline. In selected embodiments, one of the configured synchronization settings is stored as a dual exposure VSYNCH lock (DEVL) value which configures the ISP pipeline to detect the set of complete frames from the first and second camera image frame sequences before identifying the valid combination of different exposures and generating the output data from frames from the first and second camera image frame sequences having the second common frame number. In other selected embodiments, one of the configured synchronization settings is stored as a single step enable (SSEN) value which configures the ISP pipeline to generate the output data from a single set of frames from the first and second camera image frame sequences having the second common frame number. In selected embodiments, the first and second camera image frame sequences are processed at the ISP pipeline by scanning the first and second camera image frame sequences to identify the set of complete frames from the first and second camera image frame sequences which have the first common frame number; and by discarding image lines from the set of complete frames before identifying the valid combination of different exposures. In such embodiments, scanning of the first and second camera image frame sequences may include detecting a first vertical sync pulse for a first frame from the first camera image frame sequence; and identifying the first frame as a complete frame if a specified minimum number of image lines is received for the first frame from the first camera image frame sequence. In addition, scanning of the first and second camera image frame sequences may include detecting a second vertical sync pulse for a second frame from the second camera image frame sequence; and identifying the second frame as a complete frame if a specified minimum number of image lines is received for the second frame from the second camera image frame sequence. In selected embodiments, the ISP pipeline may be configured by a second synchronization setting having a reset value to process a combination of different exposures from the first and second camera image frame sequences having a third common frame number succeeding the second common frame number to generate the output data from the ISP pipeline. In addition or in the alternative, the ISP pipeline may be configured by the second synchronization setting having a set value to discard exposures from the first and second camera image frame sequences having a third common frame number succeeding the second common frame number so that the output data is generated only from the valid combination of different exposures from the first and second camera image frame sequences having the second common frame number. Although the described exemplary embodiments disclosed herein focus on configuring an ISP hardware apparatus to identify and continuously process valid combinations of exposures that belong to same frame number coming from a camera input module, the present invention is not necessarily limited to the example embodiments illustrate herein and may be applied to any image processing system that DEVL and SSEN configuration settings to efficiently synchronize and control single or dual exposure operations when generating ISP outputs. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A method for on-the-fly camera image processing, comprising:
   configuring, by a first processing circuit in a system-on-chip (SoC), one or more synchronization settings in a configuration register memory;
   processing, by an image signal processing (ISP) pipeline that is connected in the SoC and that is configured by a first synchronization setting having a first value, first and second camera image frame sequences having, respectively, first and second specified exposures to detect a set of complete frames from the first and second camera image frame sequences which have a first common frame number;
   identifying, by the ISP pipeline, a valid combination of different exposures from the first and second camera image frame sequences having a second common frame number succeeding the first common frame number; and
   processing, by the ISP pipeline, the valid combination of different exposures from the first and second camera image frame sequences to generate output data from the ISP pipeline.

2. The method of claim 1, where configuring one or more synchronization settings comprises storing a dual exposure VSYNCH lock (DEVL) value which configures the ISP pipeline to detect the set of complete frames from the first and second camera image frame sequences before identifying the valid combination of different exposures and generating the output data from frames from the first and second camera image frame sequences having the second common frame number.

3. The method of claim 1, where configuring one or more synchronization settings comprises storing a single step enable (SSEN) value which configures the ISP pipeline to generate the output data from a single set of frames from the first and second camera image frame sequences having the second common frame number.

4. The method of claim 1, where processing the first and second camera image frame sequences comprises:
   scanning the first and second camera image frame sequences to identify the set of complete frames from the first and second camera image frame sequences which have the first common frame number; and
   discarding image lines from the set of complete frames before identifying the valid combination of different exposures.

5. The method of claim 4, where scanning the first and second camera image frame sequences comprises:
   detecting a first vertical sync pulse for a first frame from the first camera image frame sequence; and
   identifying the first frame as a complete frame if a specified minimum number of image lines is received for the first frame from the first camera image frame sequence.

6. The method of claim 5, where scanning the first and second camera image frame sequences comprises:
   detecting a second vertical sync pulse for a second frame from the second camera image frame sequence; and
   identifying the second frame as a complete frame if a specified minimum number of image lines is received for the second frame from the second camera image frame sequence.

7. The method of claim 1, further comprising processing, by the ISP pipeline that is configured by a second synchronization setting having a reset value, a combination of different exposures from the first and second camera image frame sequences having a third common frame number succeeding the second common frame number to generate the output data from the ISP pipeline.

8. The method of claim 1, further comprising discarding, by the ISP pipeline that is configured by a second synchronization setting having a set value, exposures from the first and second camera image frame sequences having a third common frame number succeeding the second common frame number so that the output data is generated only from the valid combination of different exposures from the first and second camera image frame sequences having the second common frame number.

9. A system-on-chip (SoC), comprising:
   a configuration register memory that stores one or more synchronization settings;
   a first processing circuit that configures the configuration register memory with the one or more synchronization settings;

a first camera image frame processing circuit connected to an input camera to receive and process first and second camera image frame sequences having, respectively, first and second specified exposures; and an image signal processing (ISP) pipeline that is connected and configured:

to process, in response to a first synchronization setting having a first value, the first and second camera image frame sequences to detect a set of complete frames from the first and second camera image frame sequences which have a first common frame number;

to identify a valid combination of different exposures from the first and second camera image frame sequences having a second common frame number succeeding the first common frame number; and to process the valid combination of different exposures from the first and second camera image frame sequences to generate output data from the ISP pipeline.

10. The SoC of claim 9, where the first processing circuit configures the first synchronization setting of the configuration register memory with a dual exposure VSYNCH lock (DEVL) value so that the ISP pipeline detects the set of complete frames from the first and second camera image frame sequences before identifying the valid combination of different exposures and generating the output data from frames from the first and second camera image frame sequences having the second common frame number.

11. The SoC of claim 9, where the first processing circuit configures the first synchronization setting of the configuration register memory with a single step enable (SSEN) value so that the ISP pipeline generates the output data from a single set of frames from the first and second camera image frame sequences having the second common frame number.

12. The SoC of claim 9, where the ISP pipeline is configured to process the first and second camera image frame sequences by:

scanning the first and second camera image frame sequences to identify the set of complete frames from the first and second camera image frame sequences which have the first common frame number; and discarding image lines from the set of complete frames before identifying the valid combination of different exposures.

13. The SoC of claim 12, where the ISP pipeline is configured to scan the first and second camera image frame sequences by:

detecting a first vertical sync pulse for a first frame from the first camera image frame sequence; and identifying the first frame as a complete frame if a specified minimum number of image lines is received for the first frame from the first camera image frame sequence.

14. The SoC of claim 13, where the ISP pipeline is configured to scan the first and second camera image frame sequences by:

detecting a second vertical sync pulse for a second frame from the second camera image frame sequence; and identifying the second frame as a complete frame if a specified minimum number of image lines is received for the second frame from the second camera image frame sequence.

15. The SoC of claim 9, where the ISP pipeline is further configured to process, in response to a second synchronization setting having a reset value, a combination of different exposures from the first and second camera image frame sequences having a third common frame number succeeding the second common frame number to generate the output data from the ISP pipeline.

16. The SoC of claim 9, where the ISP pipeline is further configured to discard, in response to a second synchronization setting having a set value, exposures from the first and second camera image frame sequences having a third common frame number succeeding the second common frame number so that the output data is generated only from the valid combination of different exposures from the first and second camera image frame sequences having the second common frame number.

17. A real-time stream camera image signal processing system, comprising:

a memory device to store a dual exposure VSYNCH lock (DEVL) synchronization setting and a single step enable (SSEN) synchronization setting;

a real-time camera stream pipeline hardware circuit that is connected and configured to receive and process first and second camera image frame sequences having, respectively, first and second specified exposures; and an autoexposure control unit coupled to the memory device and connected with the real-time camera stream pipeline hardware circuit;

where the real-time camera stream pipeline hardware circuit is connected and configured:

to process, in response to the DEVL synchronization setting having a first value, the first and second camera image frame sequences to detect a set of complete frames which have a first common frame number;

to identify a valid combination of different exposures from the first and second camera image frame sequences having a second common frame number succeeding the first common frame number; and to process the valid combination of different exposures from the first and second camera image frame sequences to generate output data from the real-time camera stream pipeline hardware circuit.

18. The real-time stream camera image signal processing system of claim 17, where the real-time camera stream pipeline hardware circuit is further configured to process, in response to a single step enable (SSEN) synchronization setting having a reset value, a combination of different exposures from the first and second camera image frame sequences having a third common frame number succeeding the second common frame number to generate the output data from the ISP pipeline.

19. The real-time stream camera image signal processing system of claim 17, where the real-time camera stream pipeline hardware circuit is further configured to discard, in response to a single step enable (SSEN) synchronization setting having a set value, exposures from the first and second camera image frame sequences having a third common frame number succeeding the second common frame number so that the output data is generated only from the valid combination of different exposures from the first and second camera image frame sequences having the second common frame number.

20. The real-time stream camera image signal processing system of claim 17, where the real-time camera stream pipeline hardware circuit is configured to process the first and second camera image frame sequences by:

scanning the first and second camera image frame sequences to identify the set of complete frames from the first and second camera image frame sequences which have the first common frame number; and discarding image lines from the set of complete frames before identifying the valid combination of different exposures.

\* \* \* \* \*